United States Patent

Jordan et al.

[15] 3,678,475

[45] July 18, 1972

[54] READ ONLY MEMORY AND METHOD OF USING SAME

[72] Inventors: Paul V. Jordan, Beacon; John A. Palmieri, Wappingers Falls; William T. Wade, Poughkeepsie, all of N.Y.

[73] Assignee: International Business Machines Corporation, Armonk, N.Y.

[22] Filed: Feb. 1, 1971

[21] Appl. No.: 111,504

[52] U.S. Cl. ..........................................340/174 SP, 307/238

[51] Int. Cl. ....................................G11c 11/40, G11c 17/00

[58] Field of Search .................340/173 SR, 173 R; 307/238, 307/279

[56] References Cited

UNITED STATES PATENTS

| | | | |
|---|---|---|---|
| 3,533,088 | 10/1970 | Rapp | 340/173 R |
| 3,387,286 | 6/1968 | Dennard | 340/173 R |
| 3,465,293 | 9/1969 | Weckler | 340/173 R |
| 3,404,382 | 10/1968 | Rosenheck et al. | 340/173 SP |
| 3,488,636 | 1/1970 | Dyck | 340/173 SP |

*Primary Examiner*—Stanley M. Urynowicz, Jr.
*Attorney*—Hanifin & Jancin and Martin G. Reiffin

[57] ABSTRACT

A method and apparatus for storing in a read only memory a matrix having one or more rows each with a majority of "1" bits. There is formed the complement of each of those rows having a majority of "1" bits to form a new matrix wherein no row has a majority of "1" bits. The new matrix is stored in a read only memory. Upon reading out one or more rows of the matrix the bits of the complemented rows are reinverted.

14 Claims, 2 Drawing Figures

INVENTORS
PAUL V. JORDAN
JOHN A. PALMIERI
WILLIAM T. WADE

BY Martin G. Reiffin
ATTORNEY

READ ONLY MEMORY AND METHOD OF USING SAME

FIELD OF THE INVENTION

The present invention relates to read only stores; that is, to memories which can be read out but not capable of having data written in. The invention relates particularly to memories where the storage elements are transistors arranged in an array or matrix. For example, a "1" bit may be indicated by a transistor which is "on", and a "0" bit will then be indicated by a transistor which is "off".

DESCRIPTION OF THE PRIOR ART

Since a "0" bit is indicated by a transistor which is "off", the transistor may be unconnected and seemingly may be eliminated, except that it may be required for a different data pattern. The latter may contain all "1" bits in any row, and therefore the transistor matrix in accordance with the prior art has to include a full array of transistors to take care of any possible pattern of bits to be stored. That is, the so-called master-slice includes a full array of transistors of which only some are connected in accordance with the pattern of "1" bits. Memories in accordance with the prior art therefore included many unused and unconnected transistors each corresponding to, for example, a "0" bit.

SUMMARY OF THE INVENTION

In the present invention only half of the number of transistors is required for each row of the matrix. This is achieved by forming the complement of all rows having a "1" bit in more than half the bit locations. Upon readout an inverter again complements the inverted row.

It is therefore a primary object of the present invention to provide a novel method and apparatus for storing a matrix in a read only memory so that the latter requires only half the number of transistors heretofore required in the prior art.

DESCRIPTION OF THE PREFERRED EMBODIMENTS

Figure 1:
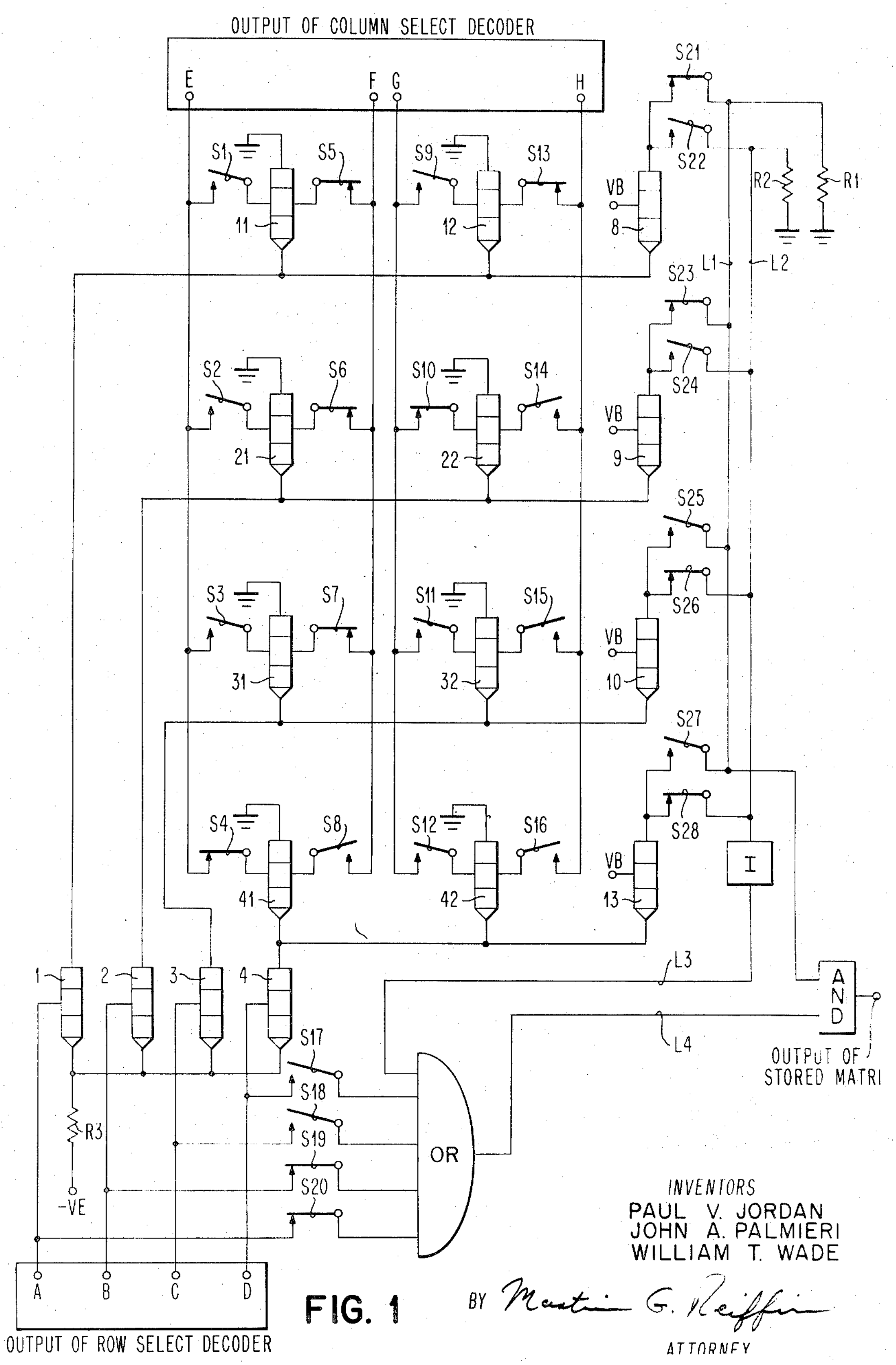
FIG. 1 shows a read-only memory in accordance with the present invention.

Although the present invention may be embodied in any read only store configuration, for purposes of illustration the following example comprises a current switch read only store having a 4 × 4 matrix of bits. Assume the matrix to be stored as follows:

| | E F | G H |
|---|---|---|
| A | 0 1 | 0 1 |
| B | 0 1 | 1 0 |
| C | 1 0 | 1 1 |
| D | 0 1 | 1 1 |

It will be seen that in rows C and D a majority of the entries are "1" bits. Taking the complements of rows C and D the matrix becomes:

| | E F | G H |
|---|---|---|
| A | 0 1 | 0 1 |
| B | 0 1 | 1 0 |
| $\bar{C}$ | 0 1 | 0 0 |
| $\bar{D}$ | 1 0 | 0 0 |

This matrix may be stored in the manner shown in the drawing. Terminals E, F, G, H represent the output of the column select decoder (not shown). Switches S1 to S16 inclusive may be open or closed to disconnect or connect terminals E, F, G, H to the respective bases of array transistors 11, 12, 21, 22, 31, 32, 41, 42. The collectors of the array transistors are connected to ground, and their emitters are connected to the collectors of transistors 1, 2, 3, 4 in the manner shown and described below.

Column E of the complemented matrix contains a "1" bit only in the fourth row. Switch S4 is closed and switches S1, S2, and S3 are open. The terminal E in the drawing is therefore shown connected to the base of transistor 41. Column F contains "1" bit entries in the first, second, and third rows. Switches S6, S7, and S8 are closed and switch S9 is open. The terminal F in the drawing is therefore shown connected to the bases of transistors 11, 21, and 31.

Column G of the matrix contains a "1" bit only in the second row. Switch S10 is closed and switches S9, S11, and S12 are open. The terminal G in the drawing is therefore shown connected to the base of transistor 22. Column H contains a "1" bit only in the first row. Switch S13 is closed and switches S14, S15, and S16 are open. Therefore the terminal H is shown connected to the base of transistor 12.

Terminals A, B, C, D represent the output of the row select decoder (not shown). Transistors 11 and 12 of the first row have their emitters connected to the collector of transistor 1 having its base connected to terminal A. Transistors 21 and 22 have their emitters connected to the collector of transistor 2 having its base connected to terminal B. Transistors 31 and 32 have their emitters connected to the collector of transistor 3 having its base connected to terminal C. Transistors 41 and 42 have their emitters connected to the collector of transistor 4 having its base connected to terminal D.

Transistors 1, 2, 3, 4 function as current sinks for the respective current switch circuits formed with the array transistors and transistors 8, 9, 10, 13. More specifically, transistors 11, 12 and 8 have their emitters connected and constitute a first current switch. Transistors 21, 22, and 9 have their emitters connected and constitute a second current switch. Transistors 31, 32 and 10 have their emitters connected and constitute a third current switch. Transistors 41, 42 and 13 have their emitters connected and constitute a fourth current switch. In each instance the emitters are connected to the respective collectors of transistors 1, 2, 3, 4. The bases of transistors 8, 9, 10, 13 are connected to reference voltage sources VB. The emitters of transistors 1, 2, 3, 4 are connected to voltage source −VE through a resistor R3.

Switches S21 and S23 are closed so that the collectors of transistors 8, 9 are connected to one end of a load resistor R1 having its other end connected to ground. Switches S26 and S28 are closed so that the collectors of transistors 10 and 13 are connected to one end of a load resistor R2 having its other end connected to ground. Switches S22, S24, S25, S27 are open.

The upper end of load resistor R1 is connected by lead L1 to one input of the AND gate. The upper end of load resistor R2 is connected by lead L2 to the inverter I. The output of the inverter I is connected by lead L3 to one input of the OR gate. The output of the latter is connected by lead L4 to the other input of the AND gate. The output of the stored matrix appears at the output of the AND gate.

Switches S19 and S20 are shown closed whereas switches S17 and S18 are open. The outputs A and B of the row select decoder (not shown) are therefore connected to respective inputs of the OR gate whereas the outputs C and D are not so connected.

It will be seen that this arrangement serves to reinvert the complemented rows upon readout. In the example shown, the rows C and D of the stored matrix are the complemented rows which will be reinverted by the inverter I as the bits of rows C and D are read at the output of the stored matrix. On the other hand, the uncomplemented rows A and B will pass to the AND gate and then to the output without passing through the inverter.

To illustrate the operation of the disclosed circuitry, the following example is given. Assume that the bit to be read out is that in the first row A and last column H. Transistor 12 therefore transmits current and transistor 8 is off. The collector of transistor 8 is therefore at an up level, as is also the lead L1. The upper input to the AND gate is therefore up.

The output A of the row select decoder is up and, since switch S20 is closed, the A input to the OR gate is up as is also the lead L4 at the lower input to the AND gate. The AND gate is thus satisfied and its output is in the up state and indicates a "1" digit in row A and column H.

It will thus be seen that only eight transistors are provided in the array and of these only six are connected. If a full matrix were provided there would be sixteen transistors instead of eight. The present invention therefore enables the use of only half the number of transistors required by arrangements in accordance with the prior art.

The above-described embodiment involves taking the complements of certain rows and compression of the original matrix in the horizontal dimension. The advantages of the present invention can also be realized by taking the complements of columns having a majority of "1" bits and compressing the original matrix in the vertical dimension. In the claims the term "vector" is employed as a generic term to mean either "row" or "column".

In order to demonstrate the versatility of this technique let us take the matrix given above. It can be seen there are a majority of "1" bits in columns F, G, and H. If we take the complements of these columns the new matrix is shown below:

| | E $\bar{F}$ | $\bar{G}$ $\bar{H}$ |
|---|---|---|
| A | 0 0 | 1 0 |
| B | 0 0 | 0 1 |
| C | 1 1 | 0 0 |
| D | 0 0 | 0 0 |

Figure 2:
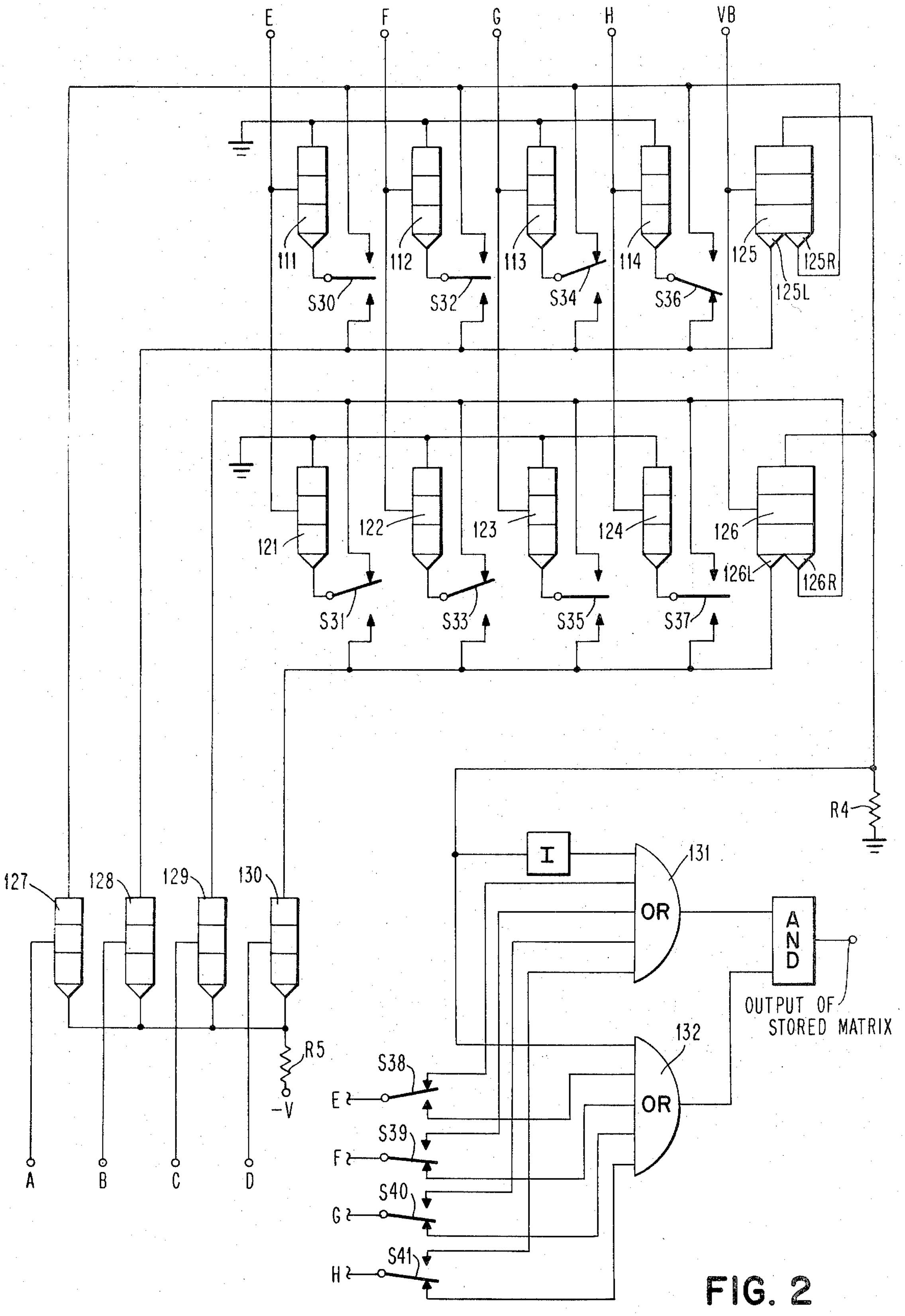
FIG. 2 shows another embodiment of the invention.

This matrix may be stored in the manner shown in FIG. 2, where the presence or absence of a bit is indicated by the appropriate connection of the storage element emitter. The mode of operation is similar to that previously described.

More specifically, switches S30 to S37 inclusive may be open, closed up, or closed down to disconnect or connect the collectors of transistors 127, 128, 129, 130 to the respective emitters of array transistors 111, 112, 113, 114, 121, 122, 123, 124. The collectors of the array transistors are connected to ground, and their bases are connected to terminals E, F, G, H which represent the output of the column select decoder (not shown).

Row A of the matrix contains a "1" bit in the third column. Switch S34 is closed up and switches S30, S32 are open. The collector of transistor T127 is therefore shown connected to the emitter of transistor 113. Row B of the matrix contains a "1" bit in the fourth column. Switch S36 is closed down which connects the emitter of transistor 114 to the collector of transistor 128.

Row C of the matrix has "1" bits in the first and second columns. Switches S31, S33 are closed up and switches S35 and S37 are open. The emitters of transistors 121, 122 are therefore shown connected to the collector of transistor 129. Since there are no "1" bits in the fourth row none of the array transistors are shown connected to the collector of transistor 130.

Transistors 127, 128, 129, 130 function as current sinks for the respective current switch circuits formed with the array transistors and transistors 125,126. More specifically, transistors 113 and 125R have their emitters connected and constitute a first current switch. Transistors 114 and 125L have their emitters connected and constitute a second current switch. Transistors 121, 122, and 126R have their emitters connected and constitute a third current switch. Since there are no "1" bits stored in the fourth row, there is no current switch formed.

In each instance the emitters are connected to the respective collectors of transistors 127,128,129,130. The bases of transistors 125,126 are connected to reference voltage source VB. The emitters of transistors 127,128,129,130 are connected to voltage source —V through a resistor R5.

The collectors of transistors 125,126 are connected together to one end of a load resistor R4 having its other end connected to ground. The load resistor R4 is connected to OR gate 132 and to OR gate 131 through an invertor block.

Connected to OR gate 131 are the column decode outputs of those columns which were not inverted and to OR gate 132 are connected those column decode outputs which were inverted. That is switch S38 is closed up thereby connecting terminal E to OR gate 131 and switches S39, S40, S41 are closed down thereby connecting terminals, F,G,H to OR gate 132. Since these OR gates are mutually exclusive input transistors can be shared. The two OR gate outputs are then connected to the AND block, whose output is the same as the original matrix.

To illustrate the operation of the disclosed circuitry, the following example is given. Assume that the bit to be read out is that in the second row B and third column G. Transistor 125L transmits current and transistor 113 is off. The collector of transistor 125 is therefore at a down level and the inverter output is at an up level. Since switch S40 is closed down both OR gates are satisfied and the two inputs of the AND gate are up. The AND gate is thus satisfied and its output indicates a "1" digit in row B and column G. Again only half the number of storage transistors are required in the array and only four of these are used.

The example above could have also been implemented in a configuration where the connection to the base indicates a "1". This could be achieved by transposing the matrix which occurs when the row decode inputs are interchanged with the column decode inputs. Thus in a particular circuit configuration one can minimize either rows or columns of the original matrix by changing the input configuration. This technique leads to useful optimization procedures.

It is to be understood that specific embodiments disclosed herein are merely illustrative of several of the many forms which the invention may take in practice without departing from the scope of the invention as delineated by the appended claims, and that the claims are to be construed as broadly as permitted by the prior art. For example, the disclosed techniques of minimization could be used in other than current switch array structures, such as in voltage mode arrays, diode arrays, and ferrite core arrays.

We claim:

1. A method for storing a matrix of a predetermined horizontal dimension and having one or more rows each with a majority of bits of a predetermined value, said method comprising the steps of forming the complement of each of those rows having a majority of said bits of a predetermined value, storing said new matrix in a transistor array of a horizontal dimension less than said matrix horizontal dimension, reading out one or more rows of the stored matrix, and re-inverting the bits of the complemented rows upon readout thereof.

2. A method for storing a matrix of a predetermined horizontal dimension and having one or more rows each with a majority of bits of a predetermined value, said method comprising the steps of forming the complement of each of those rows having a majority of said bits of a predetermined value, storing said new matrix in a transistor array of a horizontal dimension equal to one-half said matrix horizontal dimension, reading out one or more rows of the stored matrix, and re-inverting the bits of the complemented rows upon readout thereof.

3. A method for storing a matrix of a predetermined horizontal dimension and having one or more rows each with a majority of bits of a predetermined value, said method comprising the steps of forming the complement of each of those rows having a majority of said bits of a predetermined value to form a new matrix wherein no row has a majority of said bits of a predetermined value, storing said new matrix in a transistor array of a horizontal dimension, reading out one or more rows of the stored matrix, and reinverting the bits of the complemented rows upon readout thereof.

4. A method for storing and reading a matrix of predetermined horizontal and vertical dimensions and having one or more rows each with a majority of bits of a predetermined value, said method comprising the steps of forming the complement of each of those rows having a majority of said bits of a predetermined value to form a new matrix wherein no row has a majority of said bits of a predetermined value, storing said new matrix in a transistor array of a horizontal dimension equal to one-half said matrix horizontal dimension, reading out one or more rows of the stored matrix, and re-inverting the bits of the complemented rows upon readout thereof.

5. A read only memory apparatus for storing a matrix of a predetermined horizontal dimension and having one or more rows each with a majority of bits of a predetermined value, said apparatus comprising means for storing the complements of those rows having a majority of said bits, said storing means including an array of transistors each corresponding to and storing a bit of said predetermined value, said array having a horizontal dimension less than said matrix horizontal dimension.

6. A read only memory apparatus for storing a matrix of a predetermined horizontal dimension and having one or more rows each with a majority of bits of a predetermined value, said apparatus comprising means for storing the complements of those rows having a majority of said bits, said storing means including an array of transistors each corresponding to and storing a bit of said predetermined value, said array having a horizontal dimension equal to one-half said matrix horizontal dimension.

7. A read only memory for storing a matrix having one or more rows each with a majority of bits of a predetermined value, said memory comprising means for storing the complements of those rows having a majority of said bits and for storing the true values of the other rows, said storing means including an array of transistors each corresponding to and storing a bit of said predetermined value, and means for re-inverting the bits of the complemented rows upon read-out thereof.

8. A read only memory for storing a matrix of a predetermined horizontal dimension and having one or more rows each with a majority of bits of a predetermined value, said memory comprising means for storing the complements of those rows having a majority of said bits and for storing the true values of the other rows, said storing means including an array of transistors having a horizontal dimension equal to one-half said matrix horizontal dimension and each transistor corresponding to and storing a bit of said predetermined value, and means for re-inverting the bits of the complemented rows upon read-out thereof.

9. A method for storing a matrix of predetermined dimensions and having one or more vectors each with a majority of bits of a predetermined value, said method comprising the steps of forming the complement of each of those vectors having a majority of said bits of a predetermined value, storing said new matrix in a transistor array of a dimension less than said matrix dimension, reading out one or more vectors of the stored matrix, and re-inverting the bits of the complemented vectors upon readout thereof.

10. A method for storing a matrix of a predetermined vertical dimension and having one or more columns each with a majority of bits of a predetermined value, said method comprising the steps of forming the complement of each of those columns having a majority of said bits of a predetermined value, storing said new matrix in a transistor array of a vertical dimension less than said matrix vertical dimension, reading out one or more columns of the stored matrix, and re-inverting the bits of the complemented columns upon readout thereof.

11. A read only memory apparatus for storing a matrix of a predetermined vector dimension and having one or more vectors each with a majority of bits of a predetermined value, said apparatus comprising means for storing the complements of those vectors having a majority of said bits, said storing means including an array of transistors each corresponding to and storing a bit of said predetermined value, said array having a vector dimension equal to one-half said matrix vector dimension.

12. A read only memory for storing a matrix having one or more vectors each with a majority of bits of a predetermined value, said memory comprising means for storing the complements of those vectors having a majority of said bits and for storing the true values of the other vectors, said storing means including an array of transistors each corresponding to and storing a bit of said predetermined value, and means for re-inverting the bits of the complemented vectors upon read-out thereof.

13. A read only memory apparatus for storing a matrix of a predetermined vertical dimension and having one or more columns each with a majority of bits of a predetermined value, said apparatus comprising means for storing the complements of those columns having a majority of said bits, said storing means including an array of transistors each corresponding to and storing a bit of said predetermined value, said array having a vertical dimension equal to one-half said matrix vertical dimension.

14. A read only memory for storing a matrix having one or more columns each with a majority of bits of a predetermined value, said memory comprising means for storing the complements of those columns having a majority of said bits and for storing the true values of the other columns, said storing means including an array of transistors each corresponding to and storing a bit of said predetermined value, and means for re-inverting the bits of the complemented columns upon read-out thereof.

* * * * *